April 9, 1929.　　　　C. P. BIRD　　　　1,708,601
ATTACHMENT FOR TENONING MACHINES
Filed Aug. 22, 1927　　　4 Sheets-Sheet 1

Inventor
CLARENCE P. BIRD

ATTORNEYS

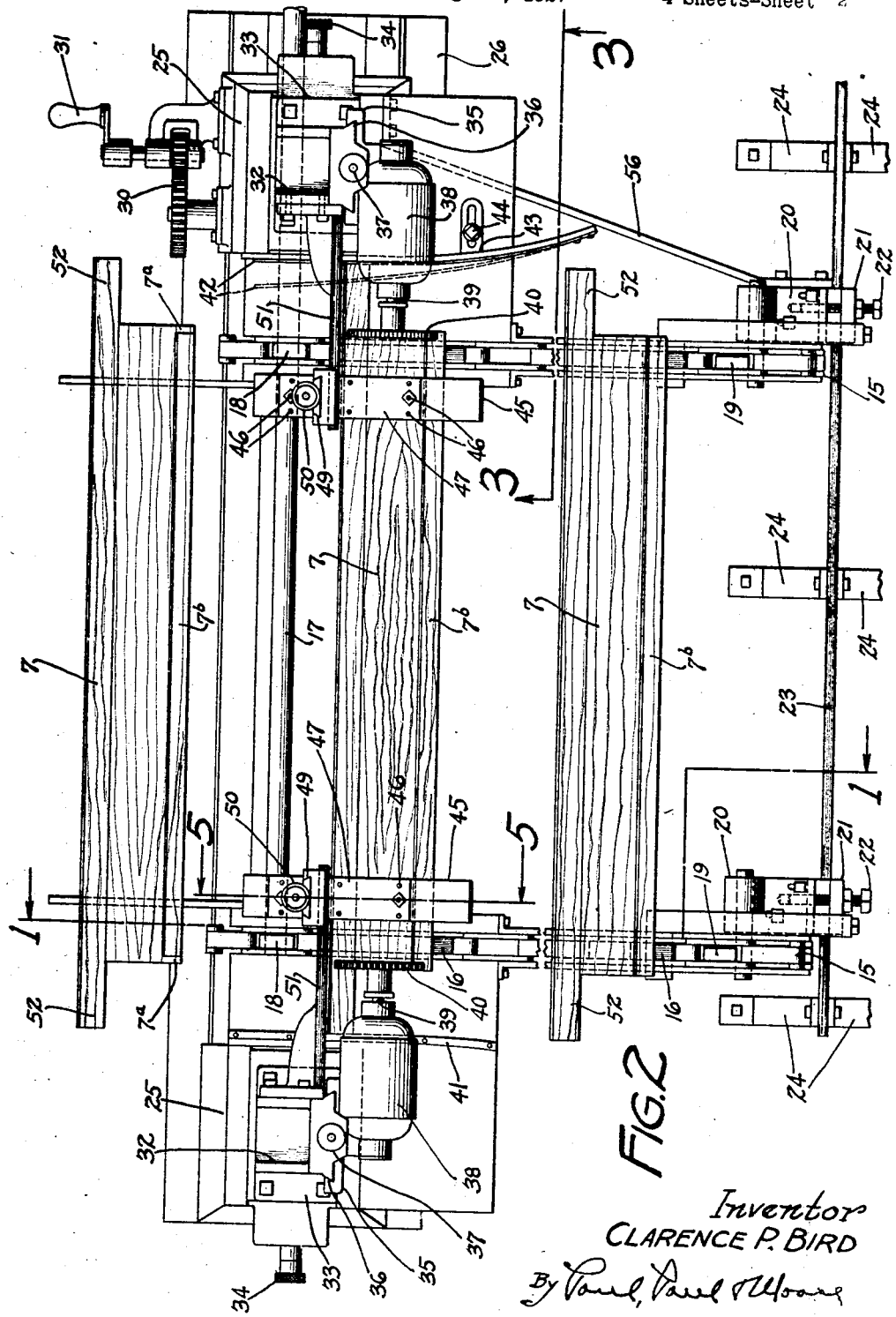

April 9, 1929.    C. P. BIRD    1,708,601
ATTACHMENT FOR TENONING MACHINES
Filed Aug. 22, 1927    4 Sheets-Sheet 3
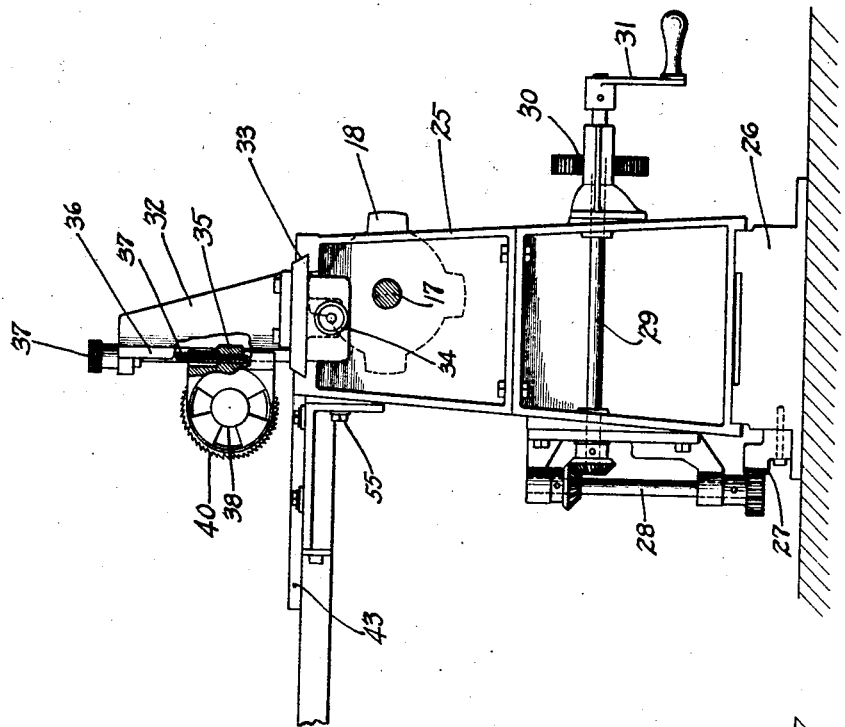
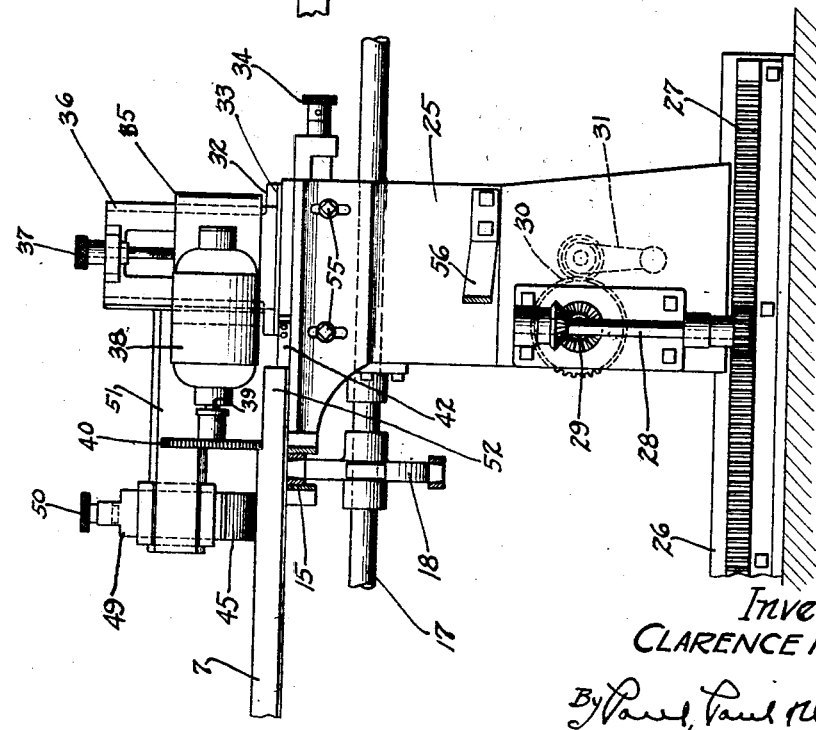
Inventor
CLARENCE P. BIRD
ATTORNEYS April 9, 1929.　　　　C. P. BIRD　　　　1,708,601
ATTACHMENT FOR TENONING MACHINES
Filed Aug. 22, 1927　　　4 Sheets-Sheet 4
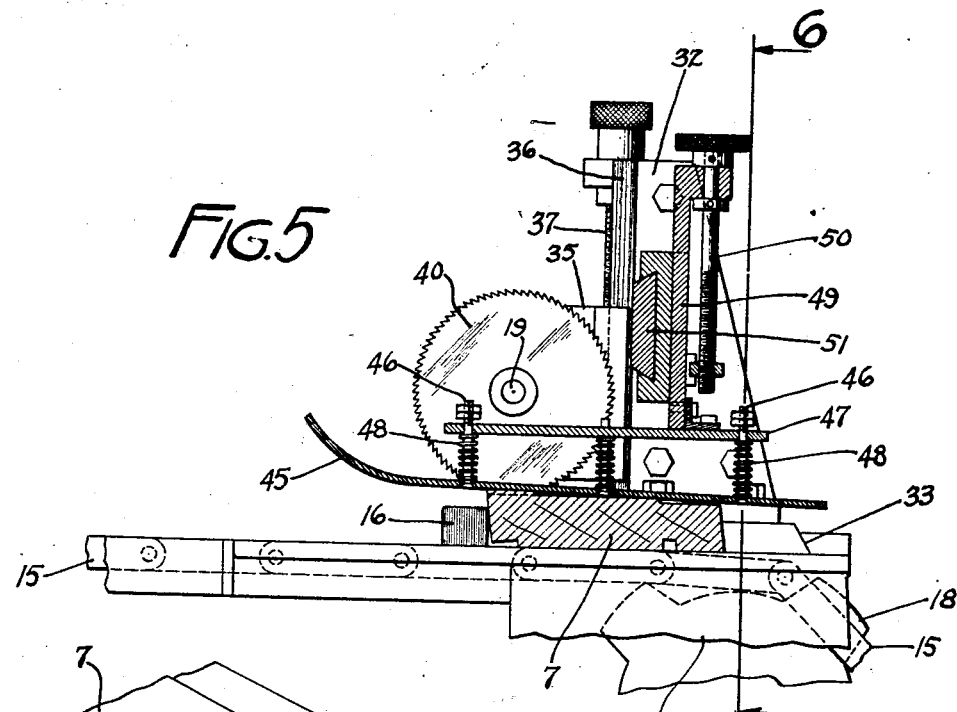
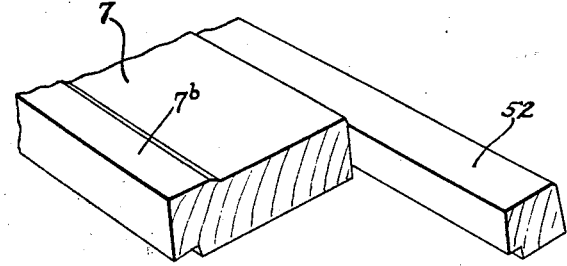
Fig.7
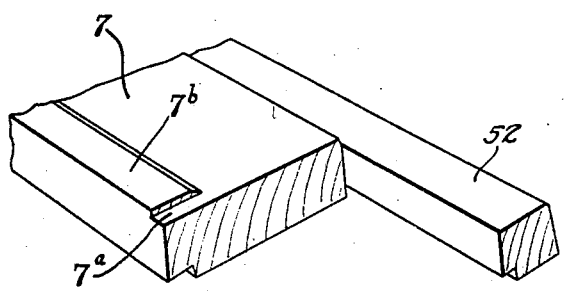
Fig.8
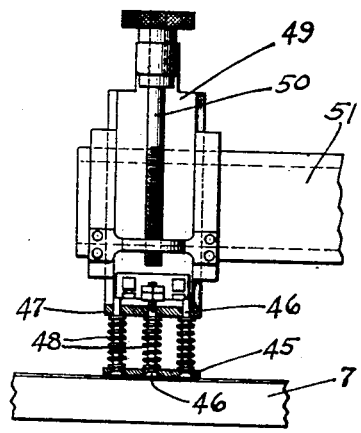
Fig.6
Inventor
CLARENCE P. BIRD
ATTORNEYS Patented Apr. 9, 1929.

1,708,601

UNITED STATES PATENT OFFICE.

CLARENCE P. BIRD, OF BAYPORT, MINNESOTA, ASSIGNOR TO ANDERSEN LUMBER COMPANY, OF BAYPORT, MINNESOTA, A CORPORATION OF WISCONSIN.

ATTACHMENT FOR TENONING MACHINES.

Application filed August 22, 1927. Serial No. 214,653.

In the manufacture of window and door sills, it has been customary to feed them through a machine for cutting tenons in the ends of the sills to receive the upright portion of the frame when the sill and frame are assembled. These sills are usually provided with longitudinal shoulders at the inner and longitudinal edges on the upper side and after the sills have been passed through the tenoning machine, it has been customary to move them to another machine and feed them through by hand to cut what is known as gains at each end of the inner shoulders of the sill. Thus considerable time and labor is required to move the sills after the tenoning operation to another machine and the services of an attendant are necessary for feeding the sills during the gaining operation.

The object therefore of my invention is to provide an attachment for a tenoning machine so that when the sills have passed through this machine and the desired tenons are cut therein, they will automatically be delivered to the attachment adapted for performing the gaining operation so that the labor of moving and manually feeding the sills intermediate the two operations is entirely eliminated.

A further object is to provide a gaining attachment of such construction that when the sills are fed from their normal edgewise position in the tenoning machine they will be delivered automatically in a horizontal position for the gaining operation.

Other objects of the invention will appear from the following detailed description.

In the accompanying drawings forming part of this specification,

Figure 2 is a plan view of the gaining attachment for the tenoning machine;

Figure 3 is a sectional view on the line 3—3 of Figure 2;

Figure 4 is a side elevation of the gaining attachment for the tenoning machine;

Figure 5 is a sectional view on the line 5—5 of Figure 2;

Figure 6 is a sectional view on the line 6—6 of Figure 5;

Figure 7 is a perspective view of the end of the sill after the tenon has been cut therein; and Figure 8 is a similar view after the gaining operation.

Figure 1:
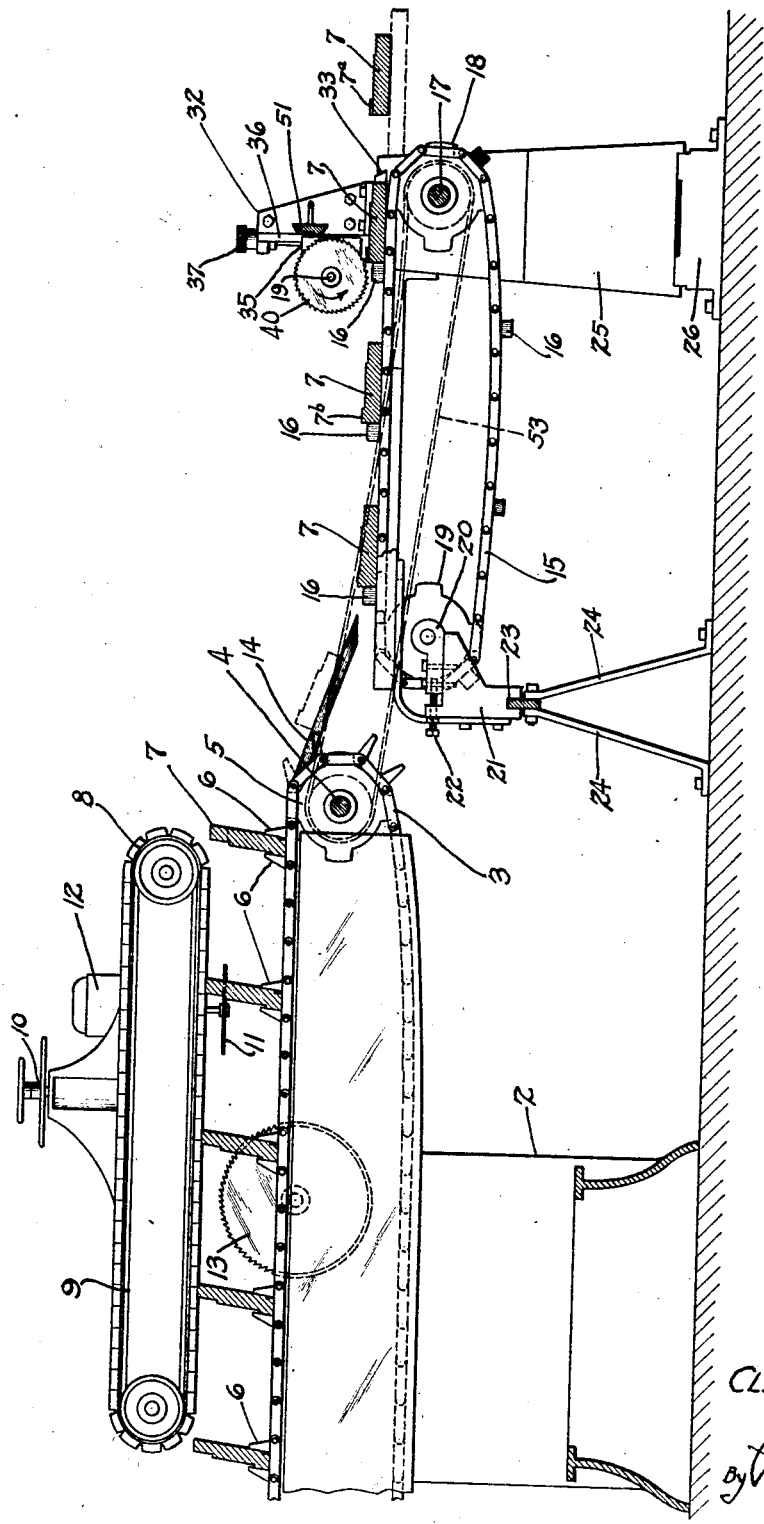
Figure 1 is a sectional view on the line 1—1 of Figure 2 showing also the tenoning machine in vertical section.

In the drawing, 2 represents the base of a standard tenoning machine; 3, a conveyer belt; 4, a drive shaft; and 5, a sprocket wheel mounted on the shaft to engage the links of the conveyer; jaws 6 are mounted at intervals in pairs upon the conveyer and between these jaws the sill 7 to be tenoned is inserted; a presser belt 8 is mounted in a suitable frame 9 above the sills on each side of the machine, and is adapted to bear upon and hold the sills firmly between the jaws 6 during the operation of cutting the tenons. The presser belts are adjustable vertically by the operating mechanism 10 which need not be illustrated or described in detail as the machine is of standard construction. Horizontally arranged saws 11 are provided at each end of the sills for cutting the horizontal or longitudinal saw cuts to form the tenons, these saws being driven from suitable motors 12; saws 13 arranged in vertical planes are positioned to form the vertical cuts in the ends of the sills and complete the tenoning operation, all as now performed with machines of this character in general use.

After the sills have been cut to form the tenons 52 they are discharged automatically from between the jaws upon an incline 14 and slide downward thereover upon a horizontally arranged conveyer 15 having lugs 16 thereon at intervals which engage the sills horizontally lying thereon and feed them forwardly to the gain cutting saws. A shaft 17 has a driving connection 53 shown in dotted lines in Figure 1 with the shaft of the tenoning machine to be operated sychronously therewith and sprocket wheels 18 are mounted on the shaft 17 to engage the conveyer 15 and similar sprockets 19 are mounted in blocks 20 that are supported on standards 21 adjacent the discharge end of the tenoning machine. The blocks 20 are adjustable by means of set screws 22 so that the tension of the conveyer can be increased or decreased as desired. The standards 21 are adapted to slide on a rail 23 that is supported by legs 24. By this means the conveyer is adapted for sills of different lengths. Standards 25 support the shaft 17 and the outer portions of the gaining machine and the right hand standard, as viewed in Figure 1, is transversely movable on the base 26 by means of the rack 27 on the base; shaft 28 geared to said rack and to a horizontal shaft 29 which is geared at 30 to the operating crank 31. The attendant by manipulating this crank can move the standard toward or from the left hand standard, which is stationary, to decrease or increase the width of the gaining machine conveyer according to the length of sills to be handled. The standards 25 have brackets 32 thereon and are adjustable transversely in guides 33 by means of adjusting screws 34. Frames 35 are vertically adjustable in guides 36 on the brackets 32 by means of adjusting screws 37 and motors 38 are carried by these frames and have arbors 39 on which saws 40 are mounted for cutting the gains 7ª in the shoulders 7ᵇ at the ends of the sills, these saws operating in vertical planes and engaging the sills at a predetermined point in their travel through the machine as indicated in Figure 1. On one side of the machine a stop 41 is provided and on the other side I provide a flat tension spring 42 which engages the ends of the sills and force their opposite ends against the stop 41 with a yielding pressure. This spring is mounted on a bracket 43 that is adjustable by means of a slide and set screw 44 provided on the standard 25.

I prefer also to provide a presser foot 45 upon each side of the machine beneath which the sills are moved by the conveyer. Each presser foot is preferably provided with upwardly projecting rods 46 slidable in a fixed plate 47 and normally held downwardly by the tension of compression springs 48. The plates 47 are mounted upon brackets 49 which are adjustable by means of adjusting screws 50 for the purpose of raising or lowering each presser foot to increase or decrease its tension on the sill beneath and the brackets 49 are adjustable transversely by means of guides 51 so that the position of each presser foot may be changed to adapt it for the different lengths of sills. The saws 40 for cutting the gains in the sills are mounted in brackets 35 which are adjustable transversely with the brackets 49 and have a vertical adjustment by means of adjusting screws 37 so that the saws may be raised or lowered as desired to accommodate the thickness of the sill and the desired depth of the gain therein.

Provision is also made for regulating the height of the table at the top of the standard by means of slots and adjusting screws 55. A suitable brace 56 is provided between the standard 25 and the bracket 21 at one side of the machine for holding the parts in their proper relative position in the operation of the machine.

To perform the tenoning and gaining operation the sills are placed manually between the jaws on the conveyer belt of the tenoning machine as illustrated in Figure 1 and as they are fed forward to a position to engage the saws the presser belts arranged above will exert a downward pressure and hold the sills during the tenoning operation. When this is completed the sills pass from under the presser belts and slowly turn from an upright to an inclined position and are discharged by gravity upon the slide 14 leading to the gaining attachment. As the sills pass down over the slide they are engaged by the upwardly projecting lugs of the conveyer 15 and fed forward in a horizontal or flatwise position to the gaining saws. These saws have previously been adjusted to accommodate the length of the sills and the depth of the gaining cut and as the sills approach the saws they will be engaged by a presser foot at each end and by the spring tension device and held firmly so that when the saws engage the sills the gaining operation will be performed smoothly and quickly and without splintering or in other ways damaging the upper surface of the sill. As the sills pass the gaining saws they may be discharged into a suitable receptacle or in a pile, the work of tenoning and gaining having been easily and quickly performed without the loss of time and manual labor usually required for moving the sills from the tenoning machine and feeding them through the gaining machine.

In various ways the detailed construction herein shown may be modified and still be within the scope of my invention.

I claim as my invention:

1. The combination with a tenoning machine having a conveyer provided with jaws thereon at intervals adapted to receive sills placed edgewise therein, and saws for cutting the ends of said sills transversely and longitudinally to form tenons thereon, of a conveyer arranged adjacent the discharge of the tenoning machine, means adapted to receive the sills after the tenoning operation and deliver them horizontally to said conveyer, means for gripping the sills, and saws adapted to cut gains in the upper surfaces of the sills at the ends thereof.

2. The combination with a tenoning machine, having means for feeding sills therethrough and holding them edgewise during the feeding movement, and means for making longitudinal and transverse cuts in the ends of the sills to form tenons thereon, of a gaining attachment comprising a conveyer, means adapted to receive the sills after the tenoning operation and deliver them horizontally to said conveyer, means for holding the sills and means for cutting transverse gain notches in the ends of the sills.

3. The combination with means for feeding window or door sills, the sills being supported in an edgewise upright position, means for cutting the ends of the sills horizontally and longitudinally to form tenons thereon, means for receiving the sills delivered flatwise by said feeding means and advancing the sills horizontally, means for gripping the sills to hold them firmly during such advancing movement and means for cutting transverse gains in the ends of the shoulders at one longitudinal edge of the sills.

4. The combination, with a tenoning machine having a conveyer provided with means adapted to receive and hold the work placed edgewise therein, and means for forming tenons in the work, of a conveyer arranged adjacent the discharge of the tenoning machine, means adapted to receive the work after the tenoning operation and deliver it horizontally to said conveyer, means for holding the horizontally delivered work and means for forming gains in the surface of the work.

5. The combination with means for feeding the work supported in an edgewise upright position, means for cutting the ends of the work horizontally and longitudinally to form tenons thereon, means for receiving the work delivered flatwise by said feeding means and advancing it horizontally, means for holding the work during such advancing movement and means for cutting transverse gains in the work adjacent a longitudinal edge.

In witness whereof, I have hereunto set my hand this 11th day of August, 1927.

CLARENCE P. BIRD.